Jan. 17, 1950   J. R. PIMLOTT ET AL   2,494,579
DIFFERENTIAL TRANSFORMER PICKUP UNIT
Filed Aug. 19, 1948
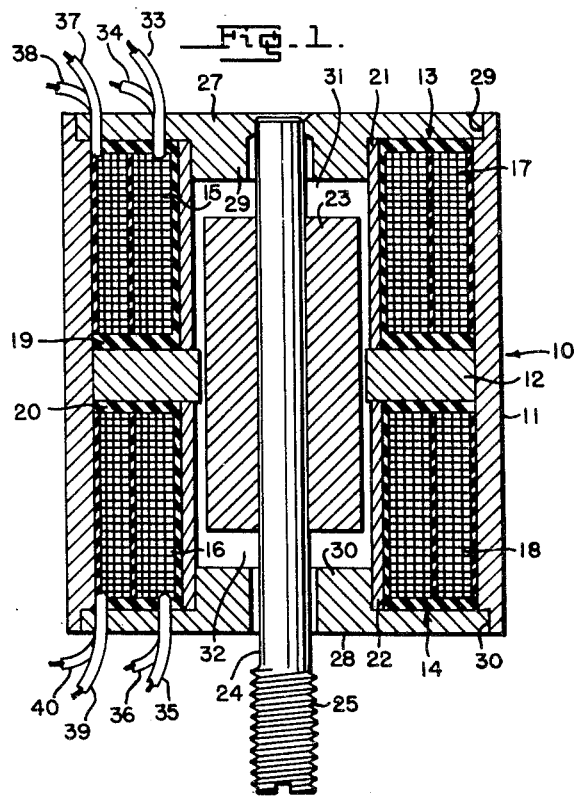
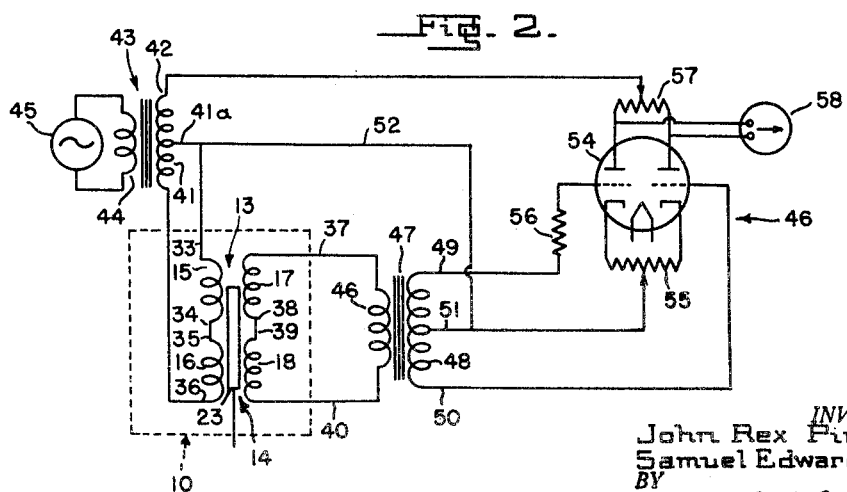
INVENTORS.
John Rex Pimlott
Samuel Edward Dawson
BY
M. C. Hayes
ATTORNEY Patented Jan. 17, 1950

2,494,579

UNITED STATES PATENT OFFICE 2,494,579

DIFFERENTIAL TRANSFORMER PICKUP UNIT

John Rex Pimlott, Potomac, and Samuel Edward Dawson, Fairway Hills, Md.

Application August 19, 1948, Serial No. 45,164

2 Claims. (Cl. 171—119)

(Granted under the act of March 3, 1883, as amended April 30, 1928; 370 O. G. 757)

The invention relates to improvements in displacement gages and more particularly to an improved electromagnetic micrometer unit.

The general object of this invention is to provide an improved construction for the transmitter element of a telemetric system whereby a change in a force or condition, such as thrust, torque, strain, pressure or temperature, which can be translated into a physical movement applicable to the transmitter unit will result in an electrical change which is proportional in direction and magnitude to the direction or sense and magnitude of the change in the applied force or condition, and which can be translated at a distance by an indicating receiver into measurable quantities which are also proportional in direction or sense and magnitude to the original change in force or condition.

Another object of the invention is to provide a magnetic micrometer in which the moving part, or armature, is small and light in mass, thus permitting substantially instantaneous response to rapid changes or transient phenomena.

A further object of the invention is the provision of a magnetic micrometer which is compensated for temperature changes.

A further and important object is to provide a magnetic micrometer unit which is magnetically shielded and which forms a totally-enclosed flux-path that is not disturbed by magnetic or metallic objects in close proximity to the unit or by external magnetic fields.

The invention also aims to provide a magnetic micrometer wherein the measuring sensitivity is independent of the absolute magnitude of the measured quantity.

Still another object is the provision of an electromagnetic micrometer having an improved flux-path for the mutual inductances of the micrometer.

Other objects and many of the attendant advantages of this invention will be readily appreciated as the same becomes better understood by reference to the following detailed description when considered in connection with the accompanying drawing wherein—

Fig. 1 is a central longitudinal sectional view of the micrometer unit.

Fig. 2 is a diagrammatic view of a telemetric circuit to which the micrometer unit may be connected.

In the drawing, which for the purpose of illustration shows only a preferred embodiment of the invention, and wherein similar reference characters denote corresponding parts throughout the views, the numeral 10 generally designates the magnetic micrometer unit which may be adapted to any type of force or strain measurements by means of suitable mountings (not shown). The micrometer unit 10 includes a cylindrical housing 11 formed of magnetic material such as silicon steel.

Centrally disposed within the housing 11 is an annular wall 12 of magnetic material, which, in the example shown, is a separately formed part. This wall 12 may of course be an integral part of the housing if desired. Disposed within the housing at opposite sides of the wall is a pair of preformed electromagnetic transformers 13, 14 having series additively connected primary windings 15, 16 and series differentially connected secondary windings 17, 18 whereby the transformers 13, 14 work in opposition. These transformers are wound on suitable insulating forms 19, 20 and are mounted on coaxially aligning cylindrical flux-shields 21, 22 made of a non-magnetic metal having a low resistivity such as copper.

Longitudinally reciprocable within the housing 11 is a coaxial core 23 also formed of a magnetic material such as silicon steel or any highly permeable alloy. This core 23 is fixed on an axial shaft 24 made of a non-magnetic material terminating at one end in a threaded portion 25. In the example shown, the shaft 24 is supported at its opposite end portion 26 in a housing end plate 27 but any other suitable means may be employed to support the core 23 coaxially within the housing and provide for adjusting the core relative to its magnetic neutral position. The housing end plates 27, 28 are formed of magnetic material and are pressed into annular grooves 29, 30 at opposite ends of the cylindrical housing. It will be noted that these end plates 27, 28 are provided with inwardly extending annular bosses 29, 30 terminating in annular faces which serve to extend the magnetic path and provide uniform flux distribution in the airgaps 31, 32. This construction provides shielding from external magnetic sources. The bosses 29, 30 extend into and serve as supports for the flux-shields 21, 22. Suitable openings are provided in the end plates for bringing out the eight leads 33—40 from the transformer coils.

Referring now to Fig. 2 which diagrammatically shows the complete telemetering system, it is clear that the series additively connected primary windings are energized by the output of one section 41 of the secondary winding 42 of a transformer 43 having its primary winding 44 energized by an alternating current source 45, and that the voltages induced in the series differentially connected secondary windings 17, 18 are opposite in polarity. The transformer secondary output leads 37, 40 are connected to the primary winding 46 of a transformer 47 having a secondary winding 48 provided with terminal leads 49, 50 and a center tap 51. This tap 51 is connected as by a conductor 52 to the tap 41a for section 41 of the secondary winding 42 of the current supply transformer 43. A suitable rectifier such as a twin triode vacuum tube 54 forms part of a phase-discriminating network 54, 55, 56, 57 similar to that disclosed in U. S. Patent 2,393,977 granted to S. E. Dawson and J. R. Pimlott, and which reflects the difference between the opposed output voltages of secondary windings 17, 18 into a suitable center-zero galvanometer 58 that indicates the direction and magnitude of the unbalanced voltages. It is to be understood that the magnetic micrometer unit 10 is not limited to use with the particular telemetric system shown in Fig. 2.

Returning now to a consideration of the magnetic micrometer unit 10 shown in Fig. 1, it is clear that the dimensions of the magnetic circuits associated with the transformers 13, 14 are so proportional that upon disposition of the core 23 in the neutral or centered position shown, the magnetic circuit for the transformer 14 through the lower half of the core 23, across the longitudinal airgap 32, through the end plate 28, through the lower half of the housing 11, through the lower half of the washer 12 and back to the core 23, has a reluctance which is equal to that of the magnetic circuit of the transformer 13 which extends through the upper half of the core, across the longitudinal airgap 31 to the upper end plate 27, through the upper half of the housing 11, through the upper half of the washer 12 and back to the upper half of the core 23. Thus, with the core 23 in the magnetic neutral position, the voltages induced in the secondary windings 17, 18 are equal in magnitude and opposite in polarity or phase relation. Any leakage flux attempting to pass from the transformers 13, 14 into the core 23 will create eddy currents in the flux shields 21, 22. These eddy currents produce magnetic fields which are 180 degrees out of phase with the leakage flux and effectively neutralize the leakage flux attempting to pass into the core 23 through other than the desired channels. Thus it will be seen that the magnetic circuits of the micrometer are completely contained within the housing 11 and end plates 27, 28 and therefore are not affected by external magnetic fields or objects.

Only a longitudinal movement of the core 23 will change the reluctance of the transformers 13, 14 and effect a voltage change in the secondary windings 17, 18. If temperature variations occur, the housing 11 will expand or contract uniformly about the centerline, both longitudinally and radially. The core 23 will also do likewise. By making the mountings for the housing 11 and the mountings for the shaft 24 and core 23 of materials having the same temperature coefficient of expansion, the magnetic micrometer unit 10 may be completely compensated for temperature changes.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An electromagnetic transmitter unit for use in alternating current telemetric systems and the like comprising a housing including a tubular shell provided with end plates having inwardly extending bosses disposed axially of the housing and terminating in spaced surfaces within the housing, an elongate armature disposed within the housing axially of the shell, said armature being of a length less than the distance between said surfaces whereby equal air gaps are formed wholly within the housing between the armature ends and said bosses upon disposition of the armature in a neutral position intermediate the ends of the housing, a partition wall centrally of the shell and surrounding the armature with a small clearance space therebetween, said shell, end plates, armature and partition wall being formed of magnetic material so as to provide continuous magnetic paths extending throughout the entire housing and constituting portions of magnetic circuits that are interrupted only by said air gaps and said clearance space within the housing, and a pair of transformers disposed coaxially within the housing at opposite end portions thereof including primary and secondary windings, said transformers being adapted to work in opposition whereby the outputs of said transformers are balanced upon disposition of said armature in said neutral position.

2. An electromagnetic transmitter unit for use in alternating current telemetric systems and the like comprising a housing including a tubular shell provided with end plates having inwardly extending bosses disposed axially of the housing and terminating in spaced surfaces within the housing, an elongate armature disposed within the housing axially of the shell, said armature being of a length less than the distance between said surfaces whereby equal air gaps are formed wholly within the housing between the armature ends and said bosses upon disposition of the armature in a neutral position intermediate the ends of the housing, a partition wall centrally of the shell and surrounding the armature with a small clearance space therebetween, said shell, end plates, armature and partition wall being formed of magnetic material to as to provide continuous magnetic paths extending throughout the entire housing and constituting portions of magnetic circuits that are interrupted only by said air gaps and said clearance space within the housing, a pair of transformers disposed coaxially within the housing at opposite end portions thereof including primary and secondary windings, said transformers being adapted to work in opposition whereby the outputs of said transformers are balanced upon disposition of said armature in said neutral position, and tubular flux-shields formed of a non-magnetic metal having a low electrical resistivity extending between said end plates and said partition, said flux-shields being disposed inwardly of said transformers and forming continuous short-circuited turns surrounding said air gaps.

JOHN REX PIMLOTT.
SAMUEL EDWARD DAWSON.

REFERENCES CITED

The following references are of record in the file of this patent:

UNITED STATES PATENTS

| Number | Name | Date |
|---|---|---|
| 1,942,751 | Evans | Jan. 9, 1934 |
| 2,311,079 | Parr | Feb. 16, 1943 |
| 2,430,757 | Conrad et al. | Nov. 11, 1947 |
| 2,450,868 | Berman | Oct. 12, 1948 |
| 2,469,137 | Strong | May 3, 1949 |